United States Patent
Xie et al.

(10) Patent No.: US 11,982,901 B2
(45) Date of Patent: May 14, 2024

(54) BACKLIGHT MODULE AND DISPLAY DEVICE THEREOF

(71) Applicant: HUIZHOU CHINA STAR OPTOELECTRONICS DISPLAY CO., LTD., Huizhou (CN)

(72) Inventors: Yuanzhi Xie, Huizhou (CN); Chao Liu, Huizhou (CN)

(73) Assignee: HUIZHOU CHINA STAR OPTOELECTRONICS DISPLAY CO., LTD., Huizhou (CN)

( * ) Notice: Subject to any disclaimer, the term of this patent is extended or adjusted under 35 U.S.C. 154(b) by 79 days.

(21) Appl. No.: 17/771,920

(22) PCT Filed: Apr. 13, 2022

(86) PCT No.: PCT/CN2022/086655
§ 371 (c)(1),
(2) Date: Apr. 26, 2022

(87) PCT Pub. No.: WO2023/184582
PCT Pub. Date: Oct. 5, 2023

(65) Prior Publication Data
US 2023/0314871 A1    Oct. 5, 2023

(30) Foreign Application Priority Data
Apr. 2, 2022    (CN) .......................... 202210349744.9

(51) Int. Cl.
*G02F 1/13357*    (2006.01)
*F21V 8/00*    (2006.01)

(52) U.S. Cl.
CPC ..... *G02F 1/133603* (2013.01); *G02B 6/0025* (2013.01); *G02F 1/133606* (2013.01)

(58) Field of Classification Search
CPC ............ G02B 6/0025; G02F 1/133606; G02F 1/133603
See application file for complete search history.

(56) References Cited

U.S. PATENT DOCUMENTS

| 11,391,877 B2 * | 7/2022 | Wang .................. G02B 6/0053 |
| 2004/0130515 A1 | 7/2004 | Chuang et al. |

(Continued)

FOREIGN PATENT DOCUMENTS

| CN | 101206280 A | 6/2008 |
| CN | 102287690 A | 12/2011 |

(Continued)

OTHER PUBLICATIONS

Chinese Office Action issued in corresponding Chinese Patent Application No. 202210349744.9 dated May 31, 2023, pp. 1-8, 18pp.

(Continued)

*Primary Examiner* — Leah Simone Macchiarolo
(74) *Attorney, Agent, or Firm* — The Roy Gross Law Firm, LLC; Roy Gross

(57) ABSTRACT

The present application discloses a backlight module and a display device. The backlight module includes a base, a light emission assembly, and a light guide plate. The light emission assembly includes light emission units disposed on a first side of a base. The light guide plate is disposed on the first side of the base. The light guide plate includes first light diffusing portions, and each of the first light diffusing portions accommodates at least one of the light emission units to diffuse light emitted from the light emission unit.

17 Claims, 3 Drawing Sheets

(56) References Cited

U.S. PATENT DOCUMENTS

| | | | | |
|---|---|---|---|---|
| 2009/0086508 A1* | 4/2009 | Bierhuizen | ....... | G02F 1/133603 362/617 |
| 2012/0275139 A1* | 11/2012 | Chen | .................... | G02B 6/0025 362/97.2 |
| 2021/0096427 A1* | 4/2021 | Yagi | ..................... | G02B 6/0036 |

FOREIGN PATENT DOCUMENTS

| | | | |
|---|---|---|---|
| CN | 103775970 | A | 5/2014 |
| CN | 206429949 | U | 8/2017 |
| CN | 107656398 | A | 2/2018 |
| CN | 109844625 | A | 6/2019 |
| CN | 110850638 | A | 2/2020 |
| CN | 111812884 | A | 10/2020 |
| CN | 112083603 | A | 12/2020 |
| CN | 212342177 | U | 1/2021 |
| CN | 112531095 | A | 3/2021 |
| CN | 112558213 | A | 3/2021 |
| TW | 201321670 | A | 6/2013 |

OTHER PUBLICATIONS

PCT International Search Report for International Application No. PCT/CN2022/086655, dated Dec. 19, 2022, 10pp.
PCT Written Opinion of the International Search Authority for International Application No. PCT/CN2022/086655, dated Dec. 19, 2022, 10pp.

* cited by examiner

BACKLIGHT MODULE AND DISPLAY DEVICE THEREOF

CROSS REFERENCE TO RELATED APPLICATIONS

This application is a National Phase of PCT Patent Application No. PCT/CN2022/086655 having International filing date of Apr. 13, 2022, which claims the benefit of priority of Chinese Patent Application No. 202210349744.9, filed Apr. 2, 2022, the contents of which are all incorporated herein by reference in their entirety.

FIELD OF INVENTION

The present application relates to a field of display technologies, especially to a backlight module and a display device having the backlight module.

BACKGROUND OF INVENTION

A mini-light emitting diodes (Mini-LED) has a self-luminous display characteristic, and its advantages comprise full solid state, long lifespan, high brightness, low power consumption, small size, ultra-high resolution, can be applied to extreme environments such as high temperature or radiation. Compared to a self-luminous display organic-LED (OLED) technology, the Mini-LED not only has higher efficiency, longer lifespan, material of comparative stability not easily affected by environment, but also can prevent an afterimage phenomenon. Because various indicators of a Mini-LED liquid crystal display (LCD) such as brightness, contrast, lifespan, viewable angle, and resolution are all better than the conventional LCD and OLED display technologies, many manufacturers deem the Mini-LED LCD as a next generation technology.

At present, the Mini-LED backlight module comprises a substrate, a plurality of Mini-LED lamp elements disposed on the substrate, and an optical film disposed on above the Mini-LED lamp elements. The Mini-LED backlight module further comprises the support columns stands between the substrate the optical film to maintain a certain mixing distance. Because a requirement to light weight and compactness of the display device, a thickness of the Mini-LED backlight module becomes thinner such that light mixing becomes smaller, which results in uneven display of the Mini-LED backlight module. To make up decrease of the light mixing distance, usually an amount of Mini-LED lamp elements in the Mini-LED backlight module is increased to fulfill a requirement of light emission of the Mini-LED backlight module. However, increase of the quantity of the Mini-LED lamp elements will lowers a yield rate of mounting the Mini-LED lamp elements and will increase a cost and a power consumption.

SUMMARY OF INVENTION

Technical Issue

The embodiment of the present application provides a backlight module and a display device that can improve uniformity of light emission of the backlight module, decrease a thickness of the backlight module, and reduce an amount of light emission units on the backlight module.

Technical Solution

An embodiment of the present application provides a backlight module comprising:

a base;
a light emission assembly comprising a plurality of light emission units disposed on a first side of the base; and
a light guide plate disposed on the first side of the base;
wherein the light guide plate comprises a plurality of first light diffusing portions, and each of the first light diffusing portions accommodates at least one of the light emission units to diffuse light emitted from the light emission units.

In an embodiment of the present application, a side of the light guide plate facing the base is bonded to the base. As such, compared to the related art using the support columns standing between an optical film and a base with a great amount of space therebetween, the embodiment of the present application uses the light guide plate directly disposed on the base as a physical support that can improve supporting strength and stability of the backlight module and reduce a thickness of the light emitting module.

In an embodiment of the present application, the first light diffusing portions comprises a plurality of first recesses defined in a side of the light guide plate near the base, each of the first recesses at least corresponds to one of the light emission units to accommodate the corresponding one of the light emission units, wherein a first light diffusing surface is disposed on a side of each of the first recesses facing a corresponding one of the light emission units, and the first light diffusing surface is disposed at an interval from a corresponding one of the light emission units. In the embodiment of the present application, the light emission units are disposed in the first recesses such that all light emitted from the light emission units can pass through the first light diffusing surface, which improves a light diffusing effect.

In an embodiment of the present application, along a direction away from the base, and an area of an aperture of the first recesses defined along a plane parallel to the base gradually decreases. the embodiment of the present application can diffuse light passing through the first light diffusing surface at more angles to improve diffusing uniformity.

In an embodiment of the present application, the first light diffusing portion further comprises second recesses defined in a side of the light guide plate away from the base, the second recesses are defined to correspond to the first recesses, and a second light diffusing surface is disposed on an inner wall of the second recess. The second light diffusing surface of the embodiment of the present application second diffuses incident light into the second recesses to further improve the diffusing effect.

In an embodiment of the present application, along a direction away from the base, and an area of an aperture of the second recesses defined along a plane parallel to the base gradually increases. The embodiment of the present application can diffuse light passing through the second light diffusing surface at more angles to improve diffusing uniformity.

In an embodiment of the present application, a depth of the second recess along a direction perpendicular to the base is less than a depth of the first recess along a direction perpendicular to the base, and an orthographic projection of the second recess on the base is within a coverage range of an orthographic projection of the first recess on the base. Because light is right above the light emission units, the second recesses in the embodiment of the present application can diffuse light right above the light emission units to further improve a light diffusing effect of the first light diffusing portions to the light emission units.

In an embodiment of the present application, the backlight module further comprises a diffusing layer disposed on a side of the light guide plate away from the base, and a second light diffusing portion is disposed on a side of the light guide plate near the base and is located between adjacent ones of the first recesses. The present application additionally disposes the diffusing layer and the second light diffusing portion on upper and lower sides of the light guide plate to further adjust the diffusing light path.

In an embodiment of the present application, an orthographic projection of the second light diffusing portion on the base at least partially overlaps an orthographic projection of the diffusing layer on the base. The embodiment of the present application increases an overlap area between the second light diffusing portion and the diffusing layer such that more light diffused by the diffusing layer can be further diffused by the second light diffusing portion, which improves the diffusing effect of the light guide plate to light.

In an embodiment of the present application, the diffusing layer comprises a plurality of diffusing structures disposed at intervals, and the diffusing structures are disposed to correspond to the first light diffusing portions; and wherein each of the diffusing structures comprises a plurality of sub-diffusing structures distributed on a side of the base away from the light emission units and corresponding to the first light diffusing portions, a distribution density of the sub-diffusing structures in any one of the diffusing structures decreases along a direction of away from a center of the diffusing structures. Because light between adjacent two of the light emission units is less, and light right above the light emission units is greater, the present application improves a distribution density of the sub-diffusing structures right above the light emission units such that light right above the light emission units can be reflected or diffused more to improve light emitting uniformity of a light emitting module.

In an embodiment of the present application, the first light diffusing portion further comprises second recesses defined in a side of the light guide plate away from the base, the second recesses are defined to correspond to the first recesses, and a second light diffusing surface is disposed on an inner wall of the second recesses; and the sub-diffusing structures in each of the diffusing structures are arranged around the second recess. the embodiment of the present application can has a diffusing effect to incident light around the second recesses.

In an embodiment of the present application, in each of the diffusing structures, an area of an orthographic projection of the sub-diffusing structures near a side of a center of the diffusing structures on the base is greater than an area of an orthographic projection of the sub-diffusing structures away from the side of the center of the diffusing structures on the base. The present application increases an area of the sub-diffusing structures right above the light emission units such that light right above the light emission units can be reflected or diffuse to improve light emitting uniformity of the light emitting module.

In an embodiment of the present application, a size of each of the diffusing structures parallel to a length direction of the base is less than or equal to a distance between adjacent two of the light emission units. The diffusing structures in the embodiment of the present application are located correspondingly right above the light emission units. When the size of the diffusing structures along the length direction of the base is less than the interval between the adjacent light emission units, the adjacent two diffusing structures are at an interval between adjacent two of the light emission units to leave a blank region such that light between the adjacent two light emission units is emitted out directly, which increases an quantity and an intensity of light between adjacent two of the light emission units.

In an embodiment of the present application, the diffusing layer covers an entire surface of a side of the light guide plate away from the base; and wherein a transmittance of the diffusing layer is greater than or equal to 10%, and is less than 100%; a reflective rate of the diffusing layer is greater than or equal to 10%, and is less than 100%; and a sum of the transmittance and the reflective rate of the diffusing layer is less than 100%. The present application has the diffusing layer covering an entire surface of light guide plate, which can simplify processes and reduce procedures.

In an embodiment of the present application, the second light diffusing portion comprises a plurality of sub-light diffusing portions distributed among adjacent ones of the first recesses; and in any one of the second light diffusing portion, a distribution density of the sub-light diffusing portions near a side of a center of the second light diffusing portion is greater than a distribution density of the sub-light diffusing portions away from the side of the center of the second light diffusing portion. Because light between adjacent two of the light emission units is less, the present application increases the distribution density of the sub-light diffusing portions near second light diffusing portion center to increase the light diffusing strength near second light diffusing portion center to improve the light diffusing effect between adjacent two of the light emission units, which improves the light emitting uniformity of the backlight module.

In an embodiment of the present application, each of the first recesses is adjacent to at least two of the second light diffusing portion, and the sub-light diffusing portions in at least adjacent two of the second light diffusing portion are disposed around the first recess. The sub-light diffusing portions in the embodiment of the present application are disposed around the first recess and can perform a diffusing effect to light around the first recess, which further improves the light emitting uniformity of the backlight module.

In an embodiment of the present application, in any one of the second light diffusing portion, an area of an orthographic projection of the sub-light diffusing portions near the side of the center of the second light diffusing portion on the base is greater than an area of an orthographic projection of the sub-light diffusing portions away from the side of the center of the second light diffusing portion on the base. The present application increases the area of the sub-light diffusing portions near second light diffusing portion center to increase the light diffusing strength near second light diffusing portion center to improve a light diffusing effect between adjacent two of the light emission units, which improves light emitting uniformity of the backlight module.

In an embodiment of the present application, a refractive index of the light guide plate is greater than or equal to 1.49, and is less than or equal to 1.53.

In an embodiment of the present application, a distance between adjacent two of the light emission units is greater than or equal to 10 mm, and is less than or equal to 100 mm. The present application, by improve the diffusing effect of the light guide plate to light, can increase an amount of light between adjacent two of the light emission units to further increase a distance between the adjacent two of the light emission units and reduce an amount of the light emission units, which lower the cost and the power consumption.

According to the above objective of the present application, a display device is provided, the display device comprises a display panel and a backlight module, the backlight module comprises:

a base;
a light emission assembly comprising a plurality of light emission units disposed on a first side of the base; and
a light guide plate disposed on the first side of the base;
wherein the light guide plate comprises a plurality of first light diffusing portions, and each of the first light diffusing portions accommodates at least one of the light emission units to diffuse light emitted from the light emission units;
wherein the display panel is disposed on a side of the light guide plate away from the base.

Advantages

Compared to the prior art, the present application disposes first light diffusing portions on locations of the light guide plate corresponding to the light emission units to further perform a diffusing effect to light emitted from each of the light emission units to improve light mixing degree and light emitting uniformity of the light emission units on the backlight module. Compared to related technologies, the present application can increase an interval between adjacent light emission units and reduce a number of the light emission units, which can reduce a light mixing distance of the backlight module and reduce a thickness of the backlight module.

DESCRIPTION OF DRAWINGS

Specific embodiments of the present invention are described in details with accompanying drawings as follows to make technical solutions and advantages of the present invention clear.

DETAILED DESCRIPTION OF PREFERRED EMBODIMENTS

Figure 1:
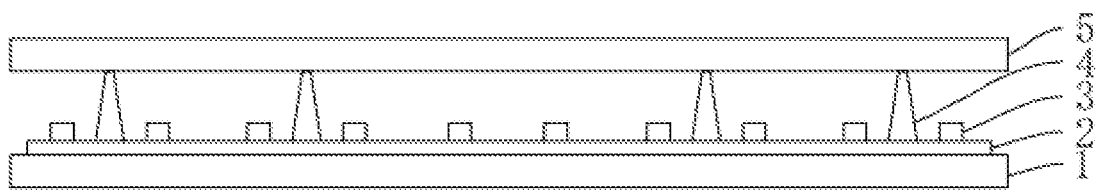
FIG. 1 is a schematic structural view of a conventional backlight module.

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

The following disclosure provides many different embodiments or examples to achieve different structures of the present application. To simplify the disclosure of the present application, the components and arrangements of the specific examples are described below. Of course, they are merely examples, and the purpose is not to limit the present application. Furthermore, the present application may repeat reference numerals and/or reference letters in different examples. The repetition is for the purpose of simplification and clarity, and does not by itself indicate the relationship between the various embodiments and/or settings discussed. In addition, the present application provides examples of various specific processes and materials, but a person of ordinary skill in the art can be aware of the application of other processes and/or the use of other materials.

With reference to FIG. 1, in the related art, a mini light emitting diode (Mini LED) backlight module comprises a base 1, a reflective layer 2 disposed on the base 1, a plurality of Mini LED lamp elements 3 disposed on the reflective layer 2, support columns 4 disposed on the base 1 and located among adjacent ones of the Mini LED lamp elements 3, and an optical film 5 disposed on a side of the support columns 4 away from the base 1, and the optical film 5 at least comprises a diffuser plate. The support columns 4 spaces the Mini LED lamp elements 3 form the optical film 5 to provide a light mixing distance. The current display device chases light weight and compactness to further usually thin a thickness of a backlight module to result in an insufficient light mixing distance of the Mini LED backlight module to have a lowered uniformity of brightness. To improve uniformity of brightness, the related technology usually increases a number of the Mini LED lamp elements 3 to improve intensity and uniformity of light emission, which lowers a mounting rate of the Mini LED backlight module and raises a cost thereof.

Figure 2:
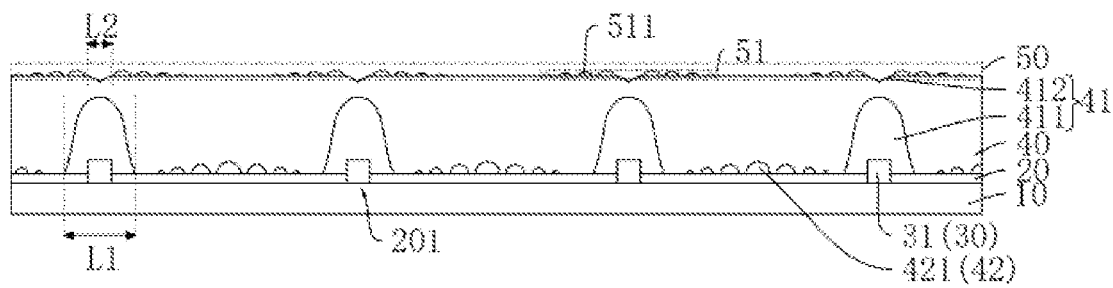
FIG. 2 is a schematic structural view of a backlight module provided by the embodiment of the present application.

An embodiment of the present application provides a backlight module, with reference to FIG. 2, the backlight module comprises base, a light emission assembly 30, and a light guide plate 40.

The light emission assembly 30 comprises a plurality of light emission units 31 disposed on a first side of base. The light guide plate 40 is disposed on a first side of the base.

Furthermore, the light guide plate 40 comprises a plurality of first light diffusing portions 41, each of the first light diffusing portions 41 accommodates at least one of the light emission units 31 to diffuse light emitted from the light emission units 31.

During embodiment and practice, the embodiment of the present application disposes the light guide plate 40 in the backlight module and disposes the first light diffusing portions 41 at the locations of the light guide plate 40 corresponding to the light emission units 31 to perform a diffusing effect to light emitted from each of the light emission units 31 such that light emitting uniformity of backlight module can be improved and light emitting brightness between adjacent ones of the light emission units 31 can be raises. Therefore, compared to the related art, the embodiment of the present application can increase a distance between adjacent ones of the light emission units 31, reduce a number of the light emission units 31 in the backlight module, increase a mounting rate of the light emission units 31, and lower a cost. Furthermore, the light guide plate 40 and the first light diffusing portions 41 can increase a light mixing degree of the backlight module to further reduce a light mixing distance to further effectively lower the thickness of the backlight module.

In particular, in an embodiment of the present application, with further reference to FIG. 1, the backlight module provided by the embodiment of the present application comprises base, the light emission assembly 30, the light guide plate 40, and a diffusing layer 50.

The base comprises a substrate 10 and a reflective layer 20 disposed on the substrate 10, and a side of the base disposed with the reflective layer 20 is the first side of the base. The light emission assembly 30, the light guide plate 40, and the diffusing layer 50 are all disposed on the first side of the base. The reflective layer 20 comprises a plurality of apertures 201. A material of the reflective layer 20 can be white ink or other reflective material, and a plurality of hollows are formed in the reflective layer 20 to form the apertures 201.

The light emission assembly comprises the light emission units 31, and the light emission units 31 is disposed on the substrate 10. One of the light emission units 31 is disposed in one of the apertures 201, and a height of the light emission units 31 is greater than a thickness of the reflective layer 20.

Optionally, the light emission units 31 can be Mini LED lamp elements.

The light guide plate 40 is disposed on the reflective layer 20, and a side of the light guide plate 40 near the reflective layer 20 contacts the reflective layer 20. Furthermore, the light guide plate 40 comprises the first light diffusing portions 41, and each of the first light diffusing portions 41 corresponds to one of the light emission units 31 to perform a diffusing effect to light emitted from each of the light emission units 31.

In particular, the first light diffusing portions 41 comprises first recesses 411 defined in a side of the light guide plate 40 near the reflective layer 20, and each of the first recesses 411 is disposed to correspond to one of the light emission units 31 to accommodate a corresponding one of the light emission units 31. Namely, the light guide plate 40 contacts and is connected to the reflective layer 20, and each of the light emission units 31 protrudes from an upper surface of the reflective layer 20. The first recesses 411 are defined in a side of the light guide plate 40 near the reflective layer 20, and the first recesses 411 are reversed to accommodate corresponding ones of the light emission units 31.

A first light diffusing surface is disposed on a side of the first recesses 411 near a corresponding one of the light emission units 31, and the first light diffusing surface is disposed at an interval from a corresponding one of the light emission units 31. Along a direction away from the substrate 10, an area of an aperture of the first recesses 411 along a direction parallel to the substrate 10 decreases such that the first recesses 411 forms a recess body tapered from bottom to top. It should be explained that a refractive index of the light guide plate 40 can be 1.49 to 1.53 such that first light diffusing surface serves as an interface between air and the light guide plate 40 to diffuse light emitted from each of the light emission units 31 when the light passes through the first light diffusing surface, which improves a light emitting angle of the light emission units 31.

Optionally, first light diffusing surface is an arc surface, and a depth of the first recess 411 along a direction perpendicular to the substrate 10 is less than a thickness of the light guide plate 40.

Furthermore, the first light diffusing portions 41 further comprises a second recesses 412 disposed on a side of the light guide plate 40 away from the reflective layer 20. one of the second recesses 412 is disposed to correspond to one of the first recesses 411, namely, each of the second recesses 412 is disposed to correspond to one of the light emission units 31. A second light diffusing surface is defined in an inner wall of the second recesses 412 to perform a diffusing effect to light emitted from each of the light emission units 31 and passing through the second light diffusing surface to further improve a light emitting angle of the light emission units 31.

In the embodiment of the present application, along a direction away from the substrate 10, an area of an aperture of a cross section of the second recesses 412 along the direction parallel to the substrate 10 increases such that the second recesses 412 forms a recess body tapered from top to bottom. Furthermore, a depth of the second recess 412 along the direction perpendicular to the substrate 10 is less than a depth of the first recess 411 along the direction perpendicular to the substrate 10. An orthographic projection of the second recesses 412 on the base is within a coverage range of an orthographic projection of the first recesses 411 on the base. In particular, a width of an aperture of a cross section of the second recesses 412 along the direction parallel to the substrate 1 is less than or equal to two-third of a width of an aperture of a cross section of the first recesses 411 along parallel to the substrate 10 direction, namely, L2 is less than or equal to two-third of L1.

As described above, the embodiment of the present application defines the first recesses 411 in a side of the light guide plate 40 near the light emission units 31 and defines the second recesses 412 in a side of the light guide plate 40 away from the light emission units 31 such that light emitted from each of the light emission units 31, passing through the first light diffusing surfaces of the first recesses 411 and the second light diffusing surfaces of the second recesses 412, can receive a diffusing effect to increase a light emitting angle of each of the light emission units 31 to improve the light emitting uniformity of the backlight module and enhance light emitting brightness between adjacent ones of the light emission units 31.

Furthermore, the diffusing layer 50 is disposed on a side of the light guide plate 40 away from the reflective layer 20. A second light diffusing portion 42 is disposed on a side of the light guide plate 40 near the reflective layer 20 and is located between adjacent two of the first recesses 411. The diffusing layer 50 can make light emitted from each of the light emission units 31 partially pass through the diffusing layer 50 and partially reflected, and when the partially reflected light is reflected among adjacent ones of the light emission units 31, the second light diffusing portion 42 further diffuses light to further improve a diffusing strength of light and improve light emitting uniformity of the backlight module.

In the embodiment of the present application, the diffusing layer 50 at least partially overlaps the second light diffusing portion 42.

In particular, the diffusing layer 50 comprises a plurality of diffusing structures 51 distributed a side of the light guide plate 40 away from the reflective layer 20 at intervals. Each of the diffusing structures 51 is disposed to correspond to one of the light emission units 31. Each of the diffusing structures 51 comprises a plurality of sub-the diffusing structures 511 on a side of a corresponding one of the light emission units 31 away from the substrate 10. In any one of the diffusing structures 51, a distribution density of the sub-the diffusing structures 511 decreases along a direction away from a center of the diffusing structures 51. It can be understood that a light emission intensity right above each of the light emission units 31 is greater than a light emission intensity of a periphery of each of the light emission units 31 such that the embodiment of the present application sets a distribution density of the sub-the diffusing structures 511 right above each of the light emission units 31 to be greater than the sub-the distribution density of the diffusing structures 511 away from the right top place to make light emission intensities of the right top place and the periphery of each of the light emission units 31 similar to improve the light emitting uniformity of the backlight module.

In the embodiment of the present application, a center of the diffusing structure 51 can coincide with a center of a corresponding one of the light emission units 31, and each of the sub-the diffusing structures 511 does not overlap the second recess 412. Furthermore, in each of the diffusing structures 51, the sub-the diffusing structures 511 are disposed around the second recesses 412.

Optionally, in each of the diffusing structures 51, an area of an orthographic projection of the sub-the diffusing structures 511 on the substrate 10 along a direction away from a center of the diffusing structures 51 decreases, and each of the sub-the diffusing structures 511 can be curved.

A size of each of the diffusing structures 51 along a length direction parallel to the substrate 10 is less than or equal to a distance between adjacent two of the light emission units 31 to lower the reflective strength among adjacent ones of the light emission units 31 and improve the light emission intensity among adjacent ones of the light emission units 31. It can be understood that the embodiment of the present application can control distribution of the diffusing structures 51 and distribution of the sub-the diffusing structures 511 of each of the diffusing structures 51 to control the reflective strength of each region in the backlight module to further control the light emission intensity of each region in the backlight module.

Optionally, a transmittance of each of the sub-the diffusing structures 511 is greater than or equal to 10%, and is less than 100%, and a reflective rate of each of the sub-the diffusing structures 511 is greater than or equal to 10%, and is less than 100%. Furthermore, a sum of the transmittance and the reflective rate of each of the sub-the diffusing structures 511 is less than 100% such that each of the sub-the diffusing structures 511 can partially reflect light and partially allow light to pass through the sub-the diffusing structure 511, which can be specifically adjusted according to actual demands.

Preferably, a transmittance of each of the sub-the diffusing structures 511 is greater than or equal to 30%, and is less than or equal to 70%.

Furthermore, the second light diffusing portion 42 comprises a plurality of sub-light diffusing portions 421 distributed among adjacent ones of the first recesses 411. In any one of the second light diffusing portion 42, a distribution density of the sub-light diffusing portions 421 near a side of a center of the second light diffusing portion 42 is greater than a distribution density of the sub-light diffusing portions 421 away from the side of the center of the second light diffusing portion 42. Namely, the nearer a center location of the adjacent ones of the light emission units 31 the sub-light diffusing portions 421 is located, the greater distribution density the sub-light diffusing portions 421 has, and the greater diffusing effect the sub-light diffusing portions 421 is, which can effectively improve light emission intensity between the light emission units 31 of a circuit.

Preferably, one first recess 411 is disposed adjacent to at least two of the second light diffusing portion 42, and the sub-light diffusing portions 421 in at least adjacent two of the second light diffusing portion 42 are disposed around the first recesses 411 to perform the diffusing effect to light on a periphery of the first recesses 411.

Furthermore, in any one of the second light diffusing portion 42, an area of an orthographic projection of the sub-light diffusing portions 421 near the side of the center of the second light diffusing portion 42 on the substrate 10 is greater than an area of an orthographic projection of the sub-light diffusing portions 421 away from the side of the center of the second light diffusing portion 42 on the substrate 10.

Optionally, each of the sub-light diffusing portions 421 can be curved.

During embodiment and practice, the second light diffusing portion 42 can be formed on a side of the light guide plate 40 near the reflective layer 20 by a laser engraving or screen printing process, and the embodiment of the present application designs layouts of the second light diffusing portion 42 and each of the sub-light diffusing portions 421 to improve the light emission intensity between adjacent ones of the light emission units 31.

Figure 3:
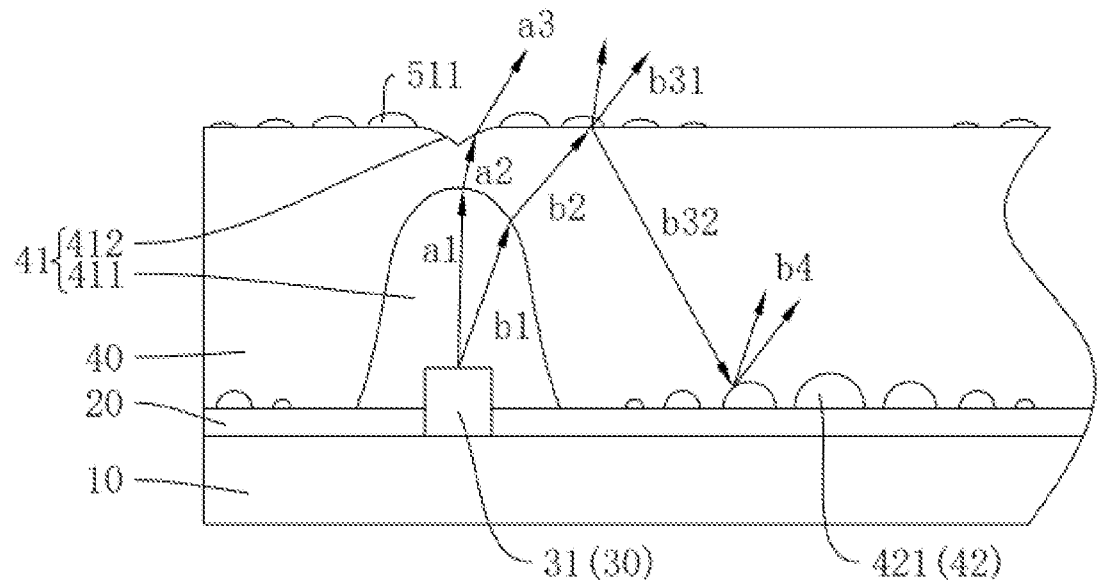
FIG. 3 is a partially enlarged schematic structural view of the backlight module provided by the embodiment of the present application.

In particular, with reference to FIGS. 1, 2, and 3, improvement performed by the light guide plate 40 and the diffusing layer 50 in the embodiment of the present application to light emitted from each of the light emission units 31 are described in detail as follows.

The light emission units 31 can emit light a1 and light b1, the light a1 is transmitted along a direction toward a right top of the light emission units 31. When the light a1 passes through the first light diffusing surface, light a1 is diffused, and its light emitting angle increases to form light a2. When the light a2 passes through the second light diffusing surface, its light emitting angle increases again to form light a3. The light a3, for the light a1, has an increasing light emitting angle such that light emitted from the light emission units 31 is diffused. In another aspect, when light 131 passes through the first light diffusing surface, its light emitting angle increases to form light b2. When the light b2 reaches the sub-the diffusing structures 511, a part of light passes through the sub-the diffusing structures 511 to form light b31, the other part of light is reflected back into the light guide plate 40 to form light b32. When the light b32 is reflected to the sub-light diffusing portions 421, diffusion of angles occurs to form light b4, and the light b4 can be emitted out among adjacent ones of the light emission units 31. Light emitted from each of the light emission units 31 can pass through the first light diffusing portions 41. Diffusion and reflection functions of the reflective layer 20 and the second light diffusing portion 42 increases the light emission intensity among adjacent ones of the light emission units 31 and increase the light emitting uniformity of the backlight module.

Because the embodiment of the present application can increase the light emitting uniformity of the backlight module and increase the light mixing degree of the backlight module such that the embodiment of the present application can also increase a distance between adjacent ones of the light emission units 31 and reduce a number of the light emission units 31 of the backlight module. Optionally, a distance between adjacent two of the light emission units 31 is greater than or equal to 10 mm, and is less than or equal to 100 mm. Furthermore, preferably, a distance between adjacent two of the light emission units 31 is greater than or equal to 10 mm, and is less than or equal to 50 mm.

Figure 4:
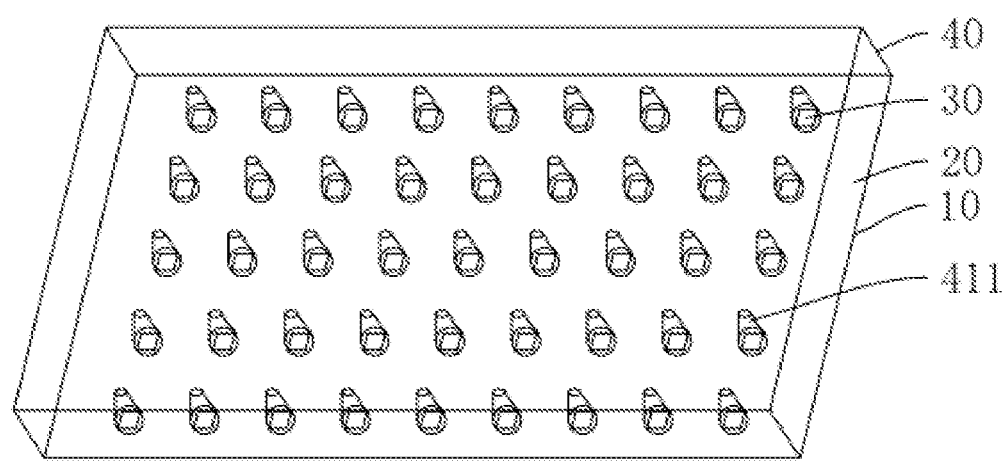
FIG. 4 is a schematical perspective structural view of provided the backlight module by the embodiment of the present application.

Optionally, the light emission units 31 can be arranged in an array on the substrate 10, and be distributed evenly to improve the light emitting uniformity of the backlight module, as shown in FIG. 4.

As described above, in the present embodiment, the diffusing effect of the first recesses 411 and the second recesses 412 increases the light emitting angle of each of the light emission units 31. The reflective effect of the diffusing layer 50 partially reflects light among adjacent ones of the light emission units 31. The light diffusing effect of the second light diffusing portion 42 diffuses light among adjacent ones of the light emission units 31, which improves the light emission intensity among adjacent ones of the light emission units 31 such that light emission intensities right above the light emission units 31 and among adjacent ones of the light emission units 31 are similar, which improves the brightness uniformity of the backlight module. Furthermore, the diffusing layer 50 of the present embodiment employs a design of the dispersed sub-the diffusing structures 511 and can control a reflective strength in each region of the backlight module by controlling distribution of the diffusing structures 51 and distribution of the sub-the diffusing structures 511 in each of the diffusing structures 51 to further control the light emission intensity of each region in the backlight module, which increases a fine control degree of the diffusing layer 50 to light.

Figure 5:
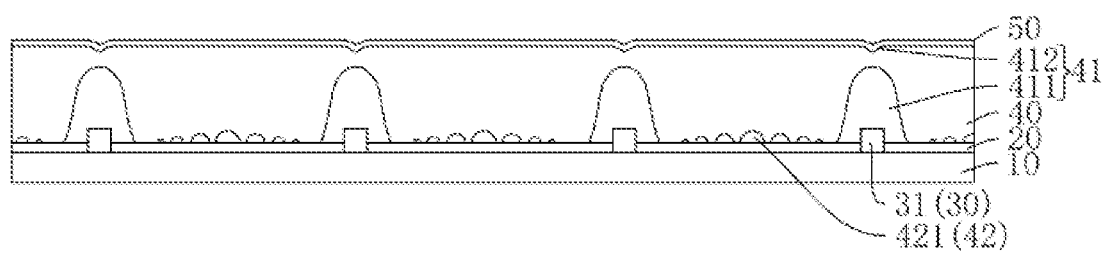
FIG. 5 is another schematic structural view of the backlight module by provided by the embodiment of the present application.

In another embodiment of the present application, with reference to FIG. 5, a difference from the previous embodiment is that the diffusing layer 50 is disposed as an entire layer, namely, the diffusing layer 50 covers an entire surface of a side of the light guide plate 40 away from the reflective layer 20.

Optionally, a transmittance of the diffusing layer 50 is greater than or equal to 10%, and is less than 100%. A reflective rate of the diffusing layer 50 is greater than or equal to 10%, and is less than 100%. Furthermore, a sum of the transmittance and the reflective rate of the diffusing layer 50 is less than 100% such that the diffusing layer 50 can partially reflect light and partially allow light to pass through the diffusing layer 50, which is specifically adjusted according to actual demands.

As described above, in the present embodiment, the diffusing effect of the first recesses 411 and the second recesses 412 can also increase the light emitting angle of each of the light emission units 31. The reflective effect of the diffusing layer 50 reflects light among adjacent ones of the light emission units 31. A light diffusing effect of the second light diffusing portion 42 can diffuse light among adjacent ones of the light emission units 31 to increase a light emission intensity among adjacent ones of the light emission units 31 such that light emission intensities right above the light emission units 31 and among adjacent ones of the light emission units 31 are similar, which improves the brightness uniformity of the backlight module. Compared to the previous embodiment, the diffusing layer 50 of the present embodiment is disposed on an entire surface of a side of the light guide plate 40 away from the reflective layer 20, which can simplify processes and lower a manufacturing cost.

Furthermore, the embodiment of the present application also provides a display device, and display device comprises the backlight module and the display panel of the above embodiment, and the display panel is disposed on a side of the light guide plate 40 away from base, namely, the display panel is disposed on a side of the light guide plate 40 away from the substrate 10.

As described above, the embodiment of the present application additionally disposes the light guide plate 40 in the backlight module, and disposes the light guide plate 40 directly on the reflective layer 20 to replace hollow structures formed by the support columns 4 in the related art with a physical structure, which improves stability of the backlight module. Furthermore, the first light diffusing portion 41 is disposed on location of the light guide plate 40 corresponding to each of the light emission units 31 to perform a diffusing effect to light emitted from each of the light emission units 31 to increase the light emitting uniformity of the backlight module, improve light emitting brightness between adjacent ones of the light emission units 31. Therefore, compared to related art, the embodiment of the present application can increase a distance between adjacent ones of the light emission units 31, reduce a number of the light emission units 31 in the backlight module, improve a mounting rate of the light emission units 31 to lower a cost. Furthermore, the light guide plate 40 and the first light diffusing portions 41 can increase a light mixing degree of the backlight module to reduce the light mixing distance without disposing the support columns 4 in the related art to further effectively reduce the thickness of the backlight module.

In the above-mentioned embodiments, the descriptions of the various embodiments are focused. For the details of the embodiments not described, reference may be made to the related descriptions of the other embodiments.

A backlight module and a display device provided by the embodiment of the present application are described in detail as above. The principles and implementations of the present application are described in the following by using specific examples. The description of the above embodiments is only for assisting understanding of the technical solutions of the present application and the core ideas thereof. Those of ordinary skill in the art should understand that they can still modify the technical solutions described in the foregoing embodiments are or equivalently replace some of the technical features. These modifications or replacements do not make the essence of the technical solutions depart from a range of the technical solutions of the embodiments of the present application.

What is claimed is:

1. A backlight module, comprising:
    a base;
    a light emission assembly comprising a plurality of light emission units disposed on a first side of the base; and
    a light guide plate disposed on the first side of the base;
    wherein the light guide plate comprises a plurality of first light diffusing portions, and each of the first light diffusing portions accommodates at least one of the light emission units to diffuse light emitted from the light emission units;
    wherein a first side of the light guide plate facing the base is bonded to the base;
    wherein the first light diffusing portions comprises a plurality of first recesses defined in the first side of the light guide plate, each of the first recesses at least corresponds to one of the light emission units to accommodate the corresponding one of the light emission units, wherein a first light diffusing surface is disposed on a side of each of the first recesses facing a corresponding one of the light emission units, and the first light diffusing surface is disposed at an interval from a corresponding one of the light emission units;
    wherein the first light diffusing portion further comprises second recesses defined in a second side of the light guide plate opposite to the first side, the second recesses are defined to correspond to the first recesses, and an inner wall of the second recess is defined as a second light diffusing surface.

2. The backlight module according to claim 1, wherein along a direction away from the base, and an area of an aperture of the first recesses defined along a plane parallel to the base gradually decreases.

3. The backlight module according to claim 1, wherein along a direction away from the base, and an area of an aperture of the second recesses defined along a plane parallel to the base gradually increases.

4. The backlight module according to claim 1, wherein a depth of the second recess along a direction perpendicular to the base is less than a depth of the first recess along a direction perpendicular to the base, and an orthographic projection of the second recess on the base is within a coverage range of an orthographic projection of the first recess on the base.

5. The backlight module according to claim 1, wherein the backlight module further comprises a diffusing layer disposed on the second side of the light guide plate, and a second light diffusing portion is disposed on the first side of the light guide plate and is located between adjacent ones of the first recesses.

6. The backlight module according to claim 5, wherein an orthographic projection of the second light diffusing portion on the base at least partially overlaps an orthographic projection of the diffusing layer on the base.

7. The backlight module according to claim 5, wherein the diffusing layer comprises a plurality of diffusing structures disposed at intervals, and the diffusing structures are disposed to correspond to the first light diffusing portions; and
    wherein each of the diffusing structures comprises a plurality of sub-diffusing structures distributed on a side of the base away from the light emission units and corresponding to the first light diffusing portions, a distribution density of the sub-diffusing structures in any one of the diffusing structures decreases along a direction of away from a center of the diffusing structures.

8. The backlight module according to claim 7, wherein the sub-diffusing structures in each of the diffusing structures are arranged around the second recess.

9. The backlight module according to claim 7, wherein in each of the diffusing structures, an area of an orthographic projection of the sub-diffusing structures near a side of a center of the diffusing structures on the base is greater than an area of an orthographic projection of the sub-diffusing structures away from the side of the center of the diffusing structures on the base.

10. The backlight module according to claim 7, wherein a size of each of the diffusing structures parallel to a length direction of the base is less than or equal to a distance between adjacent two of the light emission units.

11. The backlight module according to claim 5, wherein the diffusing layer covers an entire surface of the second side of the light guide plate; and
    wherein a transmittance of the diffusing layer is greater than or equal to 10%, and is less than 100%; a reflective rate of the diffusing layer is greater than or equal to 10%, and is less than 100%; and a sum of the transmittance and the reflective rate of the diffusing layer is less than 100%.

12. The backlight module according to claim 5, wherein the second light diffusing portion comprises a plurality of sub-light diffusing portions distributed among adjacent ones of the first recesses; and in any one of the second light diffusing portion, a distribution density of the sub-light diffusing portions near a side of a center of the second light diffusing portion is greater than a distribution density of the sub-light diffusing portions away from the side of the center of the second light diffusing portion.

13. The backlight module according to claim 12, wherein each of the first recesses is adjacent to at least two of the second light diffusing portion, and the sub-light diffusing portions in at least adjacent two of the second light diffusing portion are disposed around the first recess.

14. The backlight module according to claim 12, wherein in any one of the second light diffusing portion, an area of an orthographic projection of the sub-light diffusing portions near the side of the center of the second light diffusing portion on the base is greater than an area of an orthographic projection of the sub-light diffusing portions away from the side of the center of the second light diffusing portion on the base.

15. The backlight module according to claim 1, wherein a refractive index of the light guide plate is greater than or equal to 1.49, and is less than or equal to 1.53.

16. The backlight module according to claim 1, wherein a distance between adjacent two of the light emission units is greater than or equal to 10 mm, and is less than or equal to 100 mm.

17. A display device, comprising a display panel and a backlight module, wherein the backlight module comprises:
    a base;
    a light emission assembly comprising a plurality of light emission units disposed on a first side of the base; and
    a light guide plate disposed on the first side of the base;
    wherein the light guide plate comprises a plurality of first light diffusing portions, and each of the first light diffusing portions accommodates at least one of the light emission units to diffuse light emitted from the light emission units;
    wherein a first side of the light guide plate facing the base is bonded to the base;
    wherein the first light diffusing portions comprises a plurality of first recesses defined in the first side of the light guide plate, each of the first recesses at least corresponds to one of the light emission units to accommodate the corresponding one of the light emission units, wherein a first light diffusing surface is disposed on a side of each of the first recesses facing a corresponding one of the light emission units, and the first light diffusing surface is disposed at an interval from a corresponding one of the light emission units;
    wherein the first light diffusing portion further comprises second recesses defined in a second side of the light guide plate opposite to the first side, the second recesses are defined to correspond to the first recesses, and an inner wall of the second recess is defined as a second light diffusing surface;
    wherein the display panel is disposed on the second side of the light guide plate.

\* \* \* \* \*